(No Model.) 8 Sheets—Sheet 1.

P. J. LANDIN & F. L. WALKER.
CASH REGISTER, INDICATOR, AND RECORDER.

No. 526,402. Patented Sept. 25, 1894.

Witnesses.
J. Jessen

Inventors
Peter J. Landin
Fletcher L. Walker
By Paul Hawley Attys (No Model.) 8 Sheets—Sheet 3.
P. J. LANDIN & F. L. WALKER.
CASH REGISTER, INDICATOR, AND RECORDER.
No. 526,402. Patented Sept. 25, 1894.
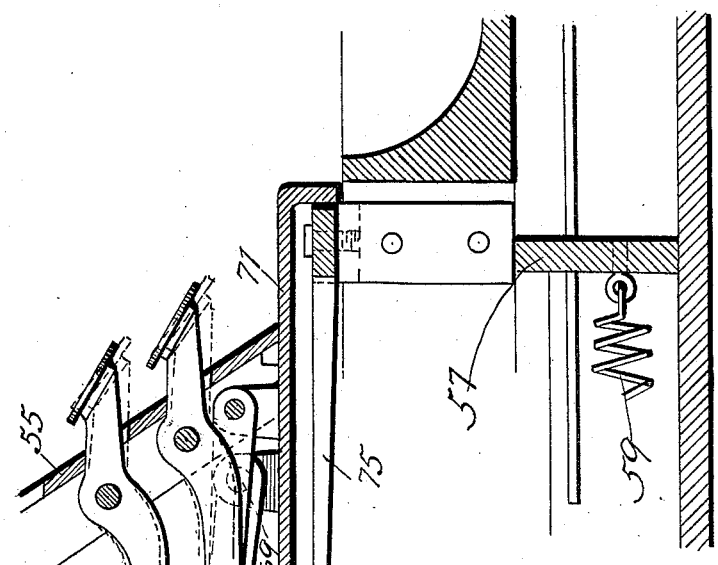
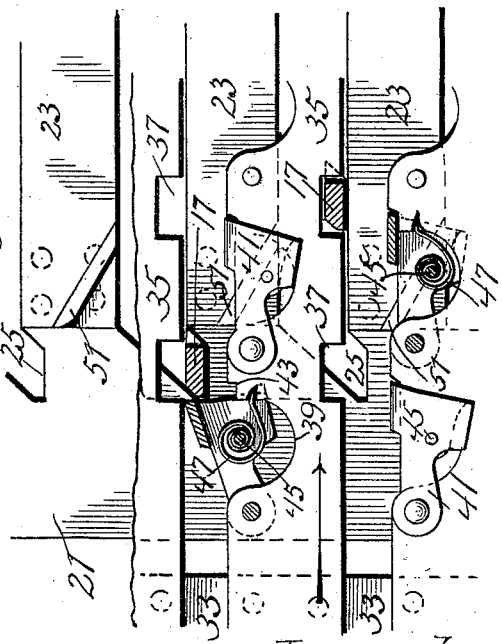
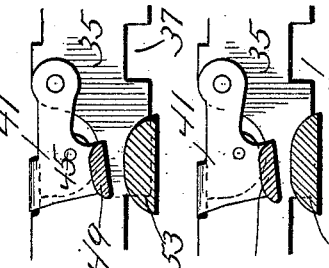
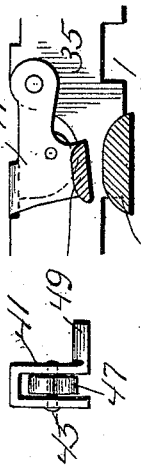
Witnesses.
J. Jessen
F. S. Lyon
Inventors.
Peter J. Landin
Fletcher L. Walker
By Paul & Hainling Attys
THE NORRIS PETERS CO., PHOTO-LITHO., WASHINGTON, D. C.

(No Model.) 8 Sheets—Sheet 4.
P. J. LANDIN & F. L. WALKER.
CASH REGISTER, INDICATOR, AND RECORDER.
No. 526,402. Patented Sept. 25, 1894.
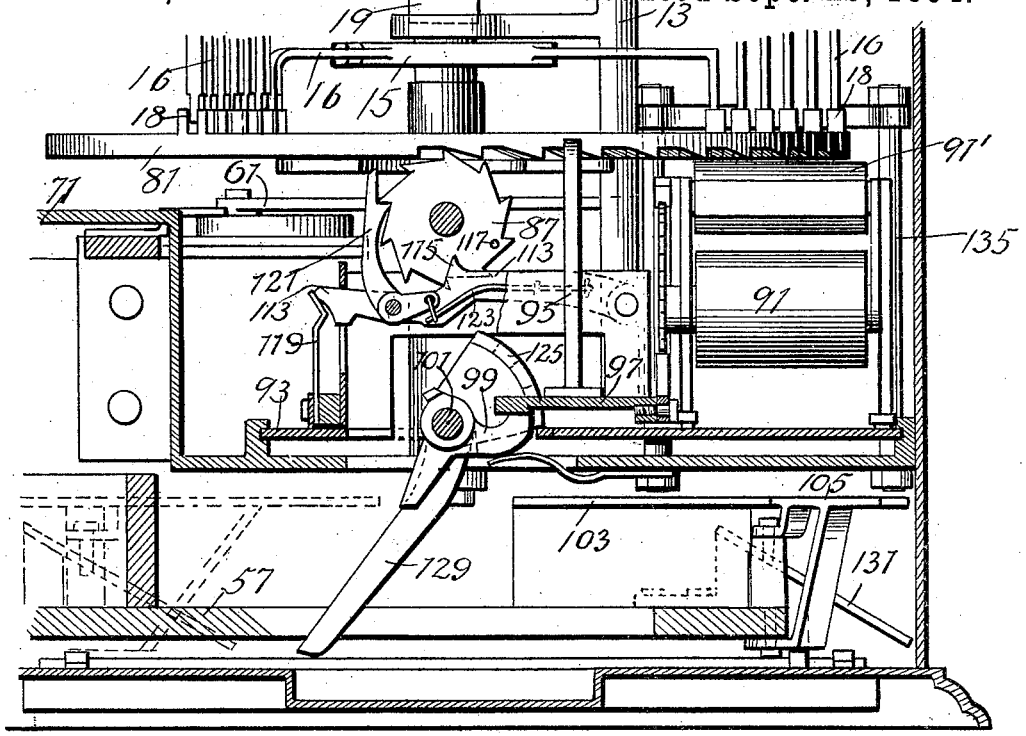
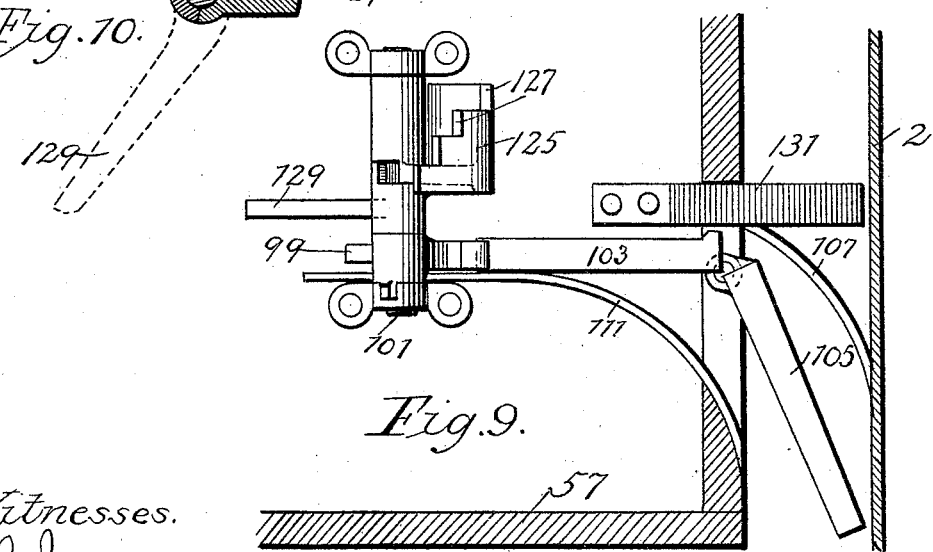
Witnesses.
J. Jessen.
Inventors.
Peter J. Landin
Fletcher L. Walker
By Paul & Hawley Attorneys.

(No Model.) 8 Sheets—Sheet 5.
P. J. LANDIN & F. L. WALKER.
CASH REGISTER, INDICATOR, AND RECORDER.
No. 526,402. Patented Sept. 25, 1894.
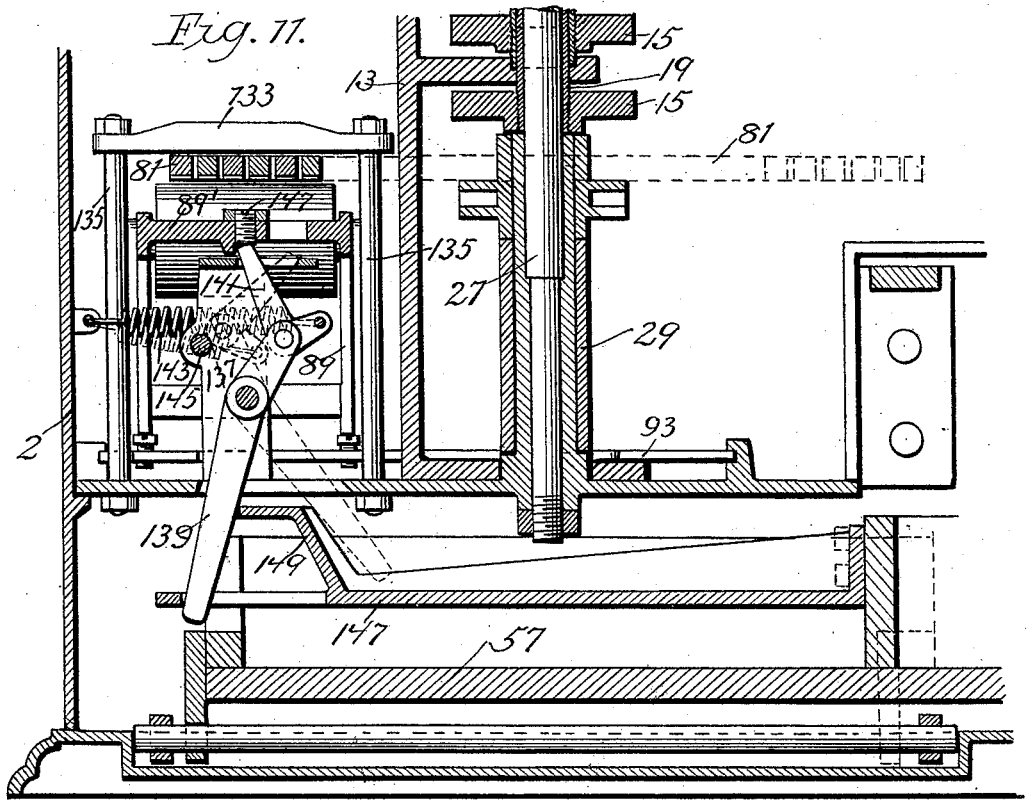
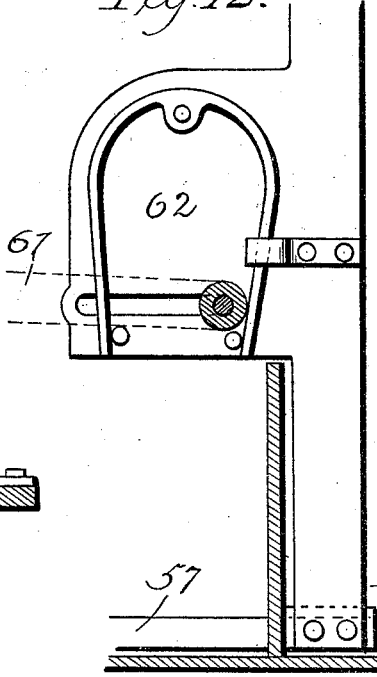
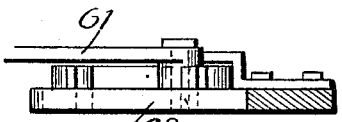
Witnesses.
Inventors.
Peter J. Landin.
Fletcher L. Walker.
By Paul & Hawley
Attorneys.

(No Model.) 8 Sheets—Sheet 6.

P. J. LANDIN & F. L. WALKER.
CASH REGISTER, INDICATOR, AND RECORDER.

No. 526,402. Patented Sept. 25, 1894.

Witnesses.
J. Jensen.

Inventors.
Peter J. Landin
Fletcher L. Walker
By Paul & Hawley att'ys (No Model.) 8 Sheets—Sheet 7.

P. J. LANDIN & F. L. WALKER.
CASH REGISTER, INDICATOR, AND RECORDER.

No. 526,402. Patented Sept. 25, 1894.

Witnesses
J. Jessen.

Inventors.
Peter J. Landin
Fletcher L. Walker.
By Paul & Hawley att'ys (No Model.) 8 Sheets—Sheet 3.
P. J. LANDIN & F. L. WALKER.
CASH REGISTER, INDICATOR, AND RECORDER.
No. 526,402. Patented Sept. 25, 1894.
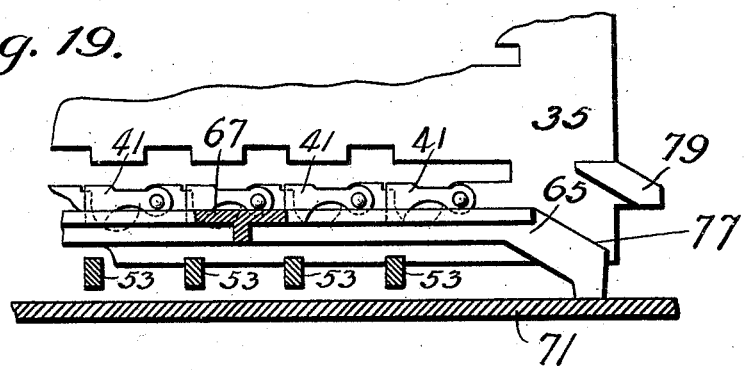
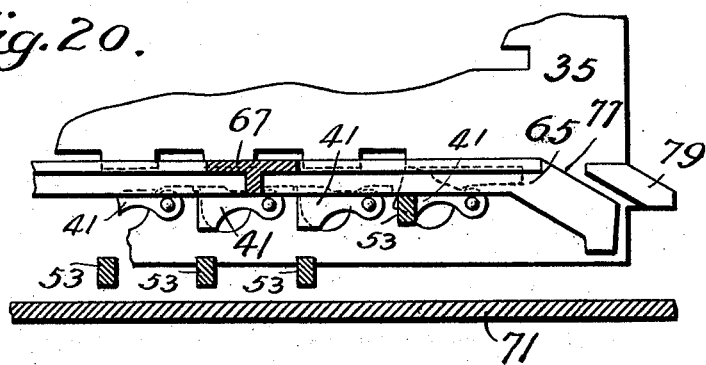
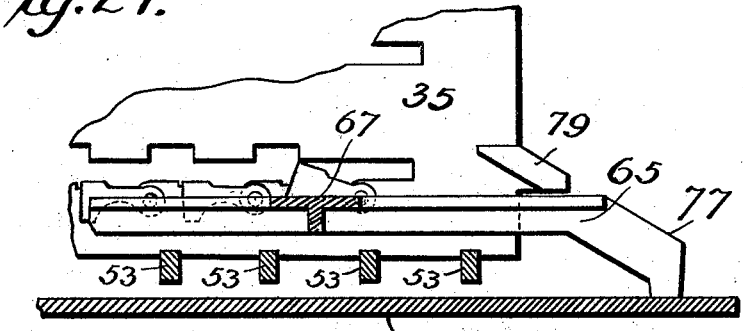

UNITED STATES PATENT OFFICE.

PETER J. LANDIN AND FLETCHER L. WALKER, OF MINNEAPOLIS, MINNESOTA, ASSIGNORS TO THOMAS B. WALKER AND SARAH E. WILSON, OF SAME PLACE.

CASH REGISTER, INDICATOR, AND RECORDER.

SPECIFICATION forming part of Letters Patent No. 526,402, dated September 25, 1894.

Application filed March 24, 1893. Serial No. 467,405. (No model.)

*To all whom it may concern:*

Be it known that we, PETER J. LANDIN and FLETCHER L. WALKER, of Minneapolis, in the county of Hennepin and State of Minnesota, have invented certain new and useful Improvements in Cash Indicators, Registers, and Recorders, of which the following is a specification.

The present invention relates particularly to improvements in the cash-indicator, register and recorder shown and described in our application for Letters Patent filed December 21, 1891, Serial No. 415,794; and the objects of the invention are to simplify the construction of the machine shown in said application and to render the operation of the keys more easy and certain.

Other objects of the invention will appear from the following detailed description taken in connection with the accompanying drawings, forming a part of this specification, in which—

Figure 1:
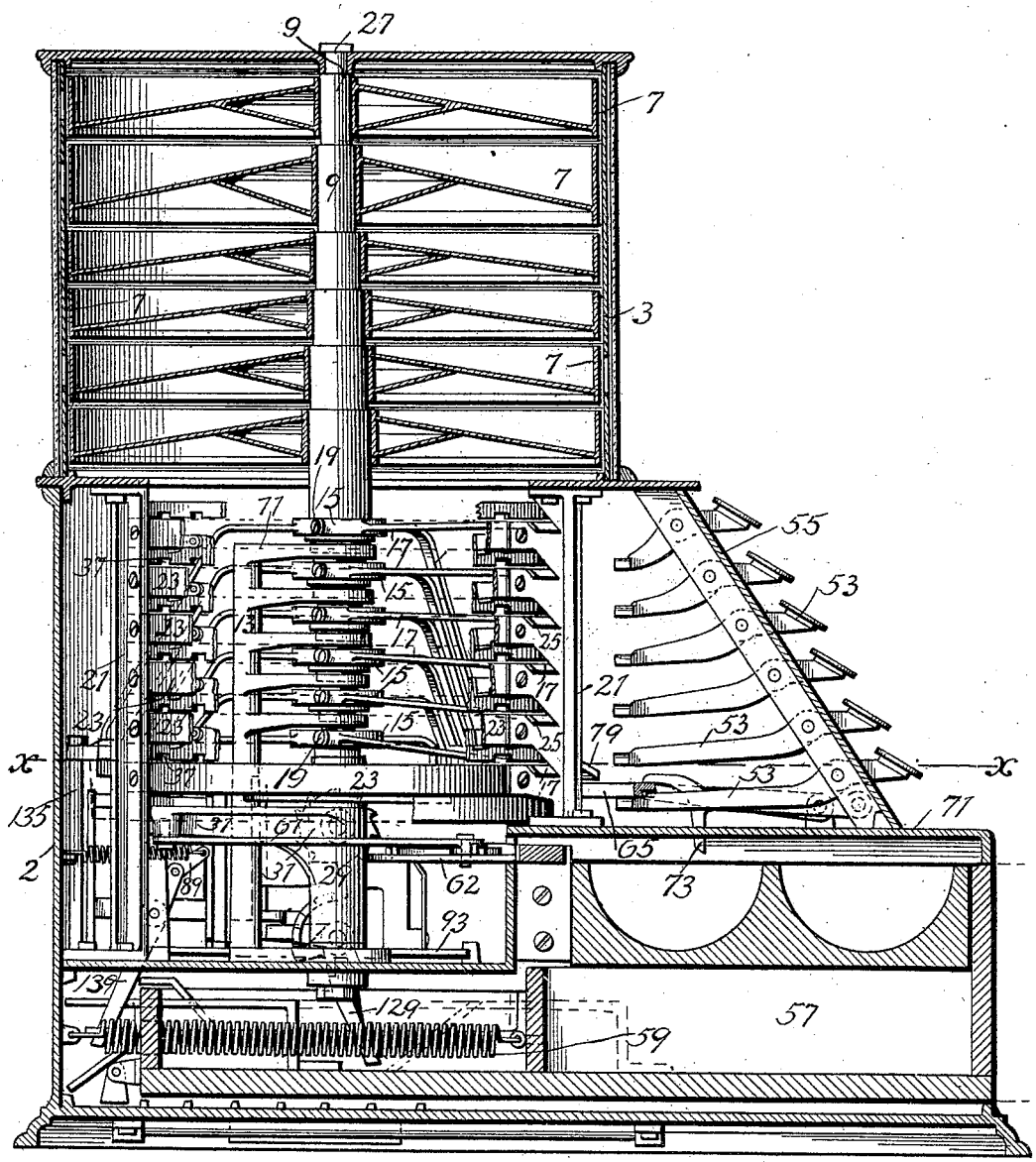
Figure 2:
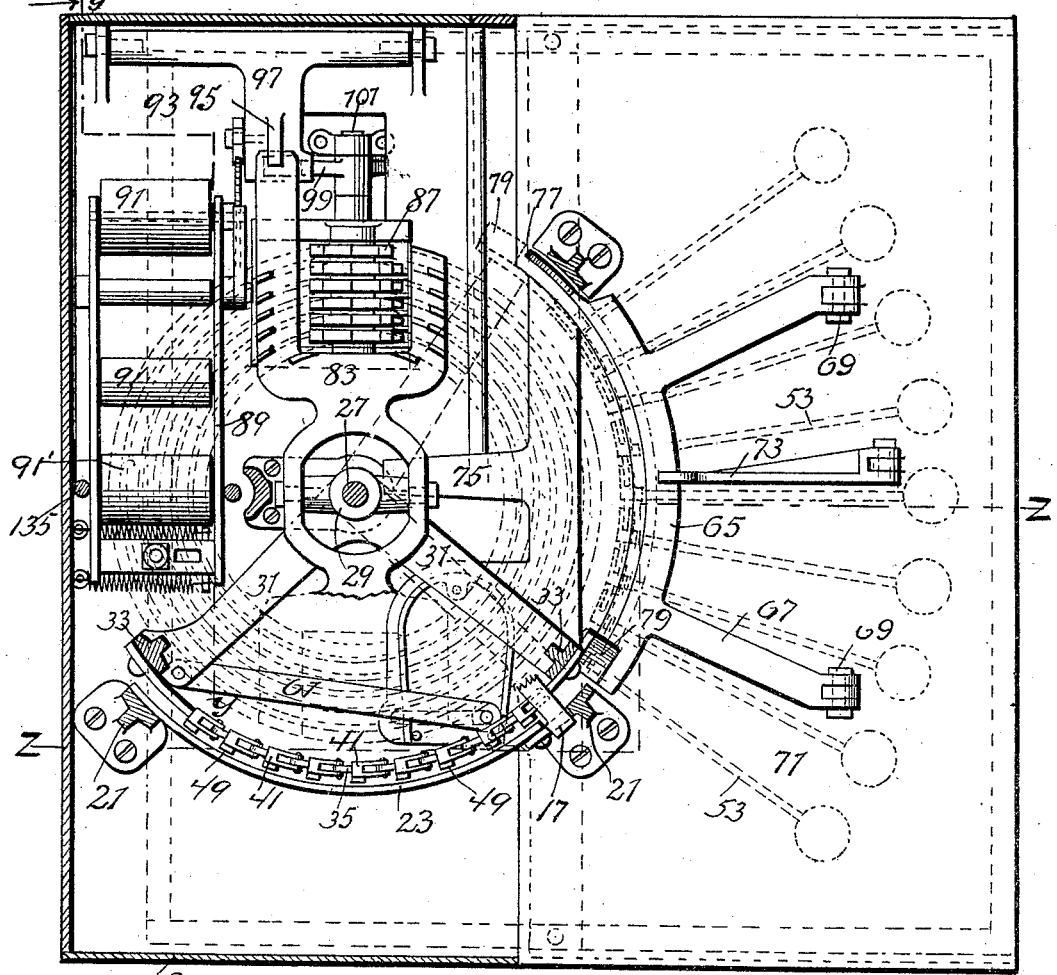
Figure 3:
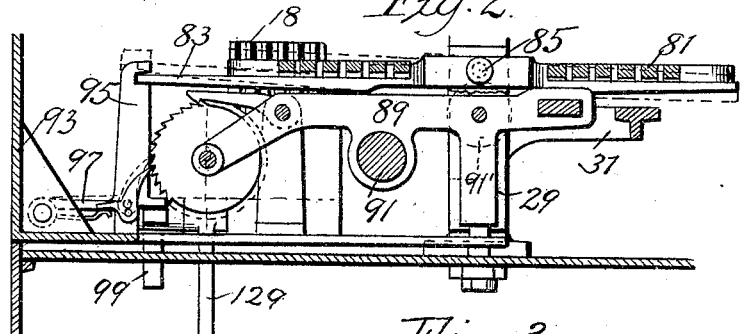
Figure 14:
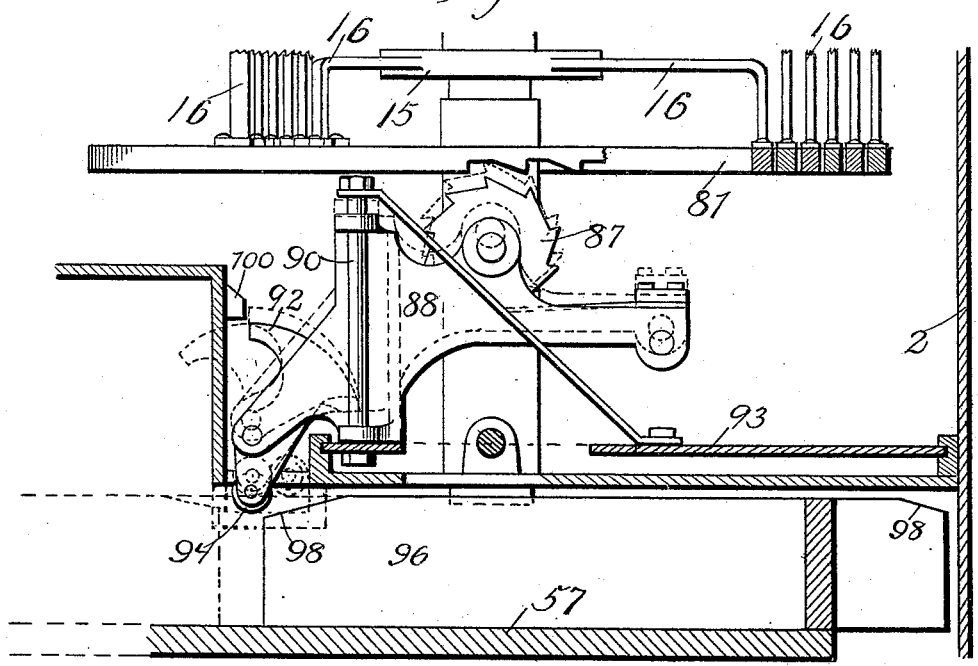
Figure 15:
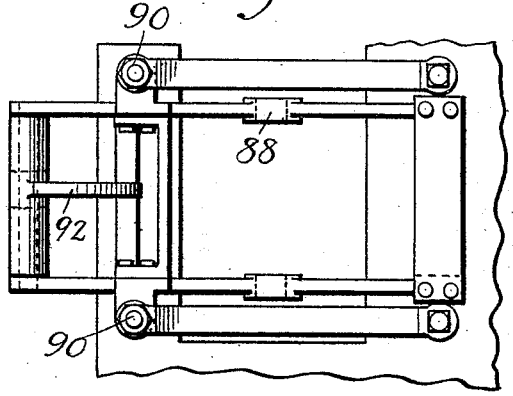
Figure 16:
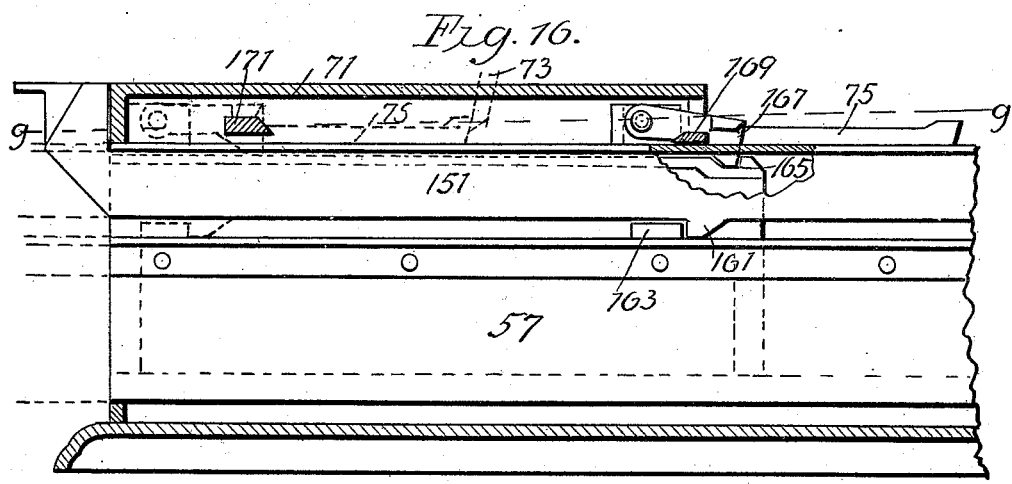
Figure 17:
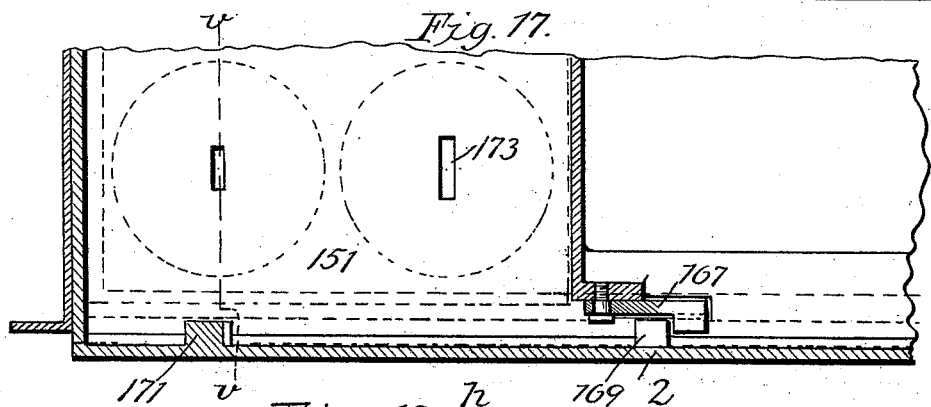
Figure 18:
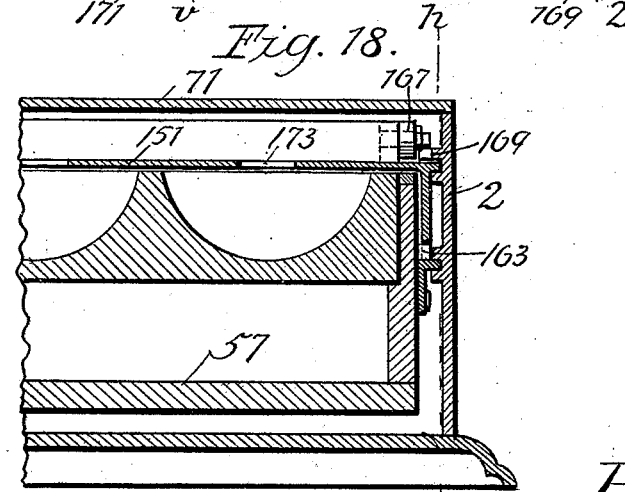

Figure 1 is a vertical section of a machine constructed in accordance with our invention. Fig. 2 is a longitudinal section on the line x—x of Fig. 1. Fig. 3 is a detail of a portion of the printing mechanism. Figs. 4, 5, 6, and 7 are details showing the key-action and the mechanism co-operating therewith. Figs. 8, 9 and 10 are details of the registering mechanism and the means for operating the same, and showing also the means for raising the registering bars. Fig. 11 is a view of the device for operating the recording mechanism. Figs. 12 and 13 are details showing the connection between the sliding drawer and the connecting lever that connects with the swinging arms. Figs. 14 and 15 are details of a modified means for operating the registering device in which the registering wheels are raised and lowered instead of raising and lowering the registering bars as shown in the other construction. Figs. 16, 17 and 18 are detail views showing modifications of the sliding cash drawer and its connection with the operating mechanism. Figs. 19, 20 and 21 are details of the device for locking and releasing the lower set of keys.

In our present invention the general arrangement of the keys is similar to that of our application above referred to but instead of using a stationary cash receptacle we have here shown and described a sliding cash drawer that is connected to the operating mechanism, and the operating keys are entirely independent of the stop mechanism and are used simply to set the stop mechanism as desired.

In the drawings, 2 represents the casing that incloses the lower or main part of the machine, and 3 represents the casing that incloses the upper part or tower in which the indicating wheels are located. These indicating wheels 7 are mounted upon vertical tubular shafts 9 as described in our former application. The tower is provided with suitable openings through which the figures on the wheels may be seen, all as described in our former application. The tubular shafts 9 are supported upon bearings 11 on a stationary standard 13, see Fig. 1, and these wheels are free to rotate in either direction independently of each other. Secured upon each of the tubular shafts 9 is a collar 15 provided with a radially projecting arm 17. These collars are pivotally secured to the tubular shafts by means of the screws or pins 19 so that while the collar and the shaft rotate together the collar and the arm are free to move or rock upon the pin 19 whereby the outer end of the arm is capable of being raised or lowered. Secured in suitable standards 21 is the slotted curved guide-plate 23. See Fig. 1. This plate is provided with a horizontal slot for each of the arms 17, and these slots at one end are downwardly inclined so as to form the notches 25. See Fig. 1. When the arms are at this end of the guide-plate they are thrown down by the inclined upper wall of the slot so that their ends rest in the notches 25, and the ends of the slots form stops which limit the movement of the arms. When the arms are in the notches 25 the indicating wheels are set at zero and the distance that they are moved from this notch determines the figures or characters that are shown by the wheels. A central shaft 27 is arranged inside of the tubular shaft 9 and forms the center upon which the tubular shaft rotates. See Fig. 1.

Arranged below these shafts is a collar 29 capable of turning freely upon the shaft 27 and provided with the radially extending arms 31 (as shown in Fig. 2) upon the ends of which are the standards 33. These standards have secured to them the series of narrow curved plates 35 said plates being arranged concentrically with the guide-plate 23 and at a short distance inside of said guide-plate. The arms 17 project through the spaces between these plates. The lower edges of the plates 35 are provided with the series of notches 37 and the lower edge of each plate 35 is substantially on a level with the upper edge of each part of the guide-plate 23. The plates 35 are also preferably provided at their upper edges with the recesses 39 (see Fig. 7) and the series of catches or dogs 41 are pivoted to the plate adjacent to the recesses 39. These dogs are preferably made so as to embrace the upper edge of each plate 35 and when in their depressed or normal position their forward ends rest in the notches 43 and the upper surface of the dog is substantially flush with the upper edge of the plate 35. These dogs are so constructed, preferably, as to remain in their depressed or elevated positions see Figs. 4, 5, 6 and 7 and any suitable construction may be used for this purpose. We preferably provide a pin 45 extending through between the two walls of the dog to which is secured a short spiral spring 47, the other end of which is secured to the plate 35 adjacent to the recess 39. With this construction it will be noted that the end of the spring is fixed to the plate at a point substantially opposite the pivot of the dog and when the dog is raised or lowered the spring is compressed until the pin 45 passes beyond a straight line joining the pivot of the dog and the fixed end of the spring, when the spring expands and holds the dog in the position to which it is turned. By this means the dog will be held in either an elevated or a depressed position. The dog is also provided with the outwardly projecting lug 49 by means of which it is elevated or depressed. The guide-plate 23 is provided at the end nearest to the operating keys and at a point just beyond the notches 25 with the inclines 51, and when the plates 35 move by the guide-plate 23 any dog that is in an elevated position is depressed by the engagement of its lug 49 with the incline 51.

The operating keys 53 consist of a series of levers see Fig. 1 having finger pieces on the end which may be suitably marked, and these levers are pivoted in the inclined curved front 55 of the casing. The lower levers are preferably longer than the upper so that the inner ends of the levers are all preferably in the same vertical curved plane concentric with the plates 35. The plates 35 together with the standards 33 and arms 31 are capable of being turned from the positions shown by full lines in Fig. 2 to that shown by dotted lines in the same figure, and when these parts are in the positions indicated by dotted lines in Fig. 2 the lugs 49 upon the dogs 41 are directly over the ends of the key-levers 53 and there being the same number of dogs that there are keys it follows that if any key is operated the corresponding dog will be raised and left in an elevated position.

When the plates 35 are in the position shown by full lines in Fig. 2 and shown in Fig. 1, there is nothing for the key-levers to operate upon and any one or all of them may be moved without result.

When the machine is to be operated the arms 31 and the plates 35 carried thereby are turned into the positions indicated in dotted lines in Fig. 2. This brings all of the arms 17 into the notches 25 thereby setting all of the indicating wheels at zero and bringing the dogs 41 over the ends of the key-levers as shown in Fig. 4. Any suitable means may be used for turning the plates 35 into this position and any suitable means may be employed for returning these plates to the positions shown by full lines in Fig. 2 after the key-levers have been operated. We prefer to provide a spring for returning them to this position and to connect the spring either directly or indirectly to these parts and also to provide means whereby the operator first turns the plates in position to bring the dogs in position to be operated upon by the key-levers and simultaneously to put the spring under tension.

We have here shown a cash-drawer 57 provided with a spring 59 which tends to close it after it has been opened, so that the spring is put under tension each time that the drawer is opened. See Fig. 1. The drawer is provided with a plate 62 also connected to one of the arms 31 by means of a connecting rod 61, having a pin that engages a slot in the plate 62, as shown in Figs. 1, 2, 12, and 13. A curved plate 65 provided preferably with arms 67 is pivoted at 69 upon the plate 71 that is arranged above the cash-drawer and this plate 65 is above the lower row of key-levers so that when any one of said levers is operated the plate is raised. A gravity catch 73 is also pivoted on the plate 71 and it is provided with one arm that extends over and rests upon the plate 65 and with another that extends through a slot in the plate 71 and is adapted to engage an arm 75 upon the cash-drawer when the cash-drawer is drawn out. See Figs. 1 and 10. The plate 65 is preferably provided at or near one end with the incline 77 and one of the standards 33 is provided with a similar incline 79. When the arms 31 are turned into the positions shown in dotted lines in Fig. 2 the incline 79 passes beyond the plate 65, as is also indicated in dotted lines in Fig. 2 and as shown in Fig. 19. As soon as the arms 31 begin to move in the opposite direction the incline 79 passing over the incline 77 locks the plate 65 in its normal position and thus locks the lower series of key-levers as shown in Fig. 21. The operation of this part of the machine will be readily understood from the foregoing detailed description.

When it is desired to use this machine the arms 31 carrying the standards 33 and the plates 35 are turned into the positions shown by dotted lines in Fig. 2 thereby bringing the dogs 41 over the ends of the key-levers and moving the levers 17 into the notches 25 and setting all of the indicating wheels at zero. The key-levers may then be operated to indicate, register and record the amount or character of the transaction. For this purpose any suitable number of key-levers may be provided. The next to the lower row of keys indicate the kind of goods or the kind of transaction, the upper four rows of keys the amount, and the lower row of keys the clerk or person making the transaction. The keys may be operated in any order except that the lower row of keys is the last to be operated. A light touch upon any of the keys throws up the corresponding dog 41 and leaves it in an elevated position. When any one of the keys of the lower row is operated the cash-drawer is released and is closed by the spring and at the same time the arms 31 and the plates 35 are returned to the position shown by full lines in Fig. 2, bringing all of the dogs 41 away from the key-levers. As the plates 35 move by the guide plate 23 the elevated dog in each row, if there be one, engages the corresponding arm 17 and pushes it out of the notch 25 so that it rests upon the unbroken surface of the guide-plate 23 and in one of the notches 37 in the corresponding plate 35. The dog 41 is immediately depressed by engagement with the incline 51, but the arm 17 being unable to drop out of the notch or recess 37 must move with the plate 35 until such time as the plate ceases its movement, and thereby the corresponding indicating wheel will be turned so as to indicate the figure or character represented by the key that moved the dog by which the arm was engaged, as all of the dogs that are not elevated pass under the arm 17 without engagement therewith.

The mechanism for registering and recording the transactions is substantially the same as that shown and described in our former application hereinbefore referred to, but the details of construction are somewhat modified. A series of ring wheels 81 is provided upon their lower surfaces with the corresponding type and with the register actuating notches. See Figs. 3, 8, and 11. These wheels rest upon a frame 83 pivoted at 85 to a suitable support and said wheels are connected with the collars 15 on the tubular shafts of the indicating wheels, by suitable arms 16, so that the ring wheels 81 have the same movement as the indicating wheels. See Fig. 8. The series of registering wheels 87 and the frame 89 provided with rollers 91, which carry the recording strips are mounted upon a drawer-frame or slide 93 so that said parts may be removed from the machine at will. See Fig. 3. The arms 16 are connected to the ring wheels 81 by means of a sliding connection that permits said wheels to be raised or lowered without disconnecting them from said arms. For this purpose we preferably provide upon each of the wheels 81 the vertically projecting lugs 18, and the ends of the arms 16 extend into the space between said lugs. See Fig. 8. As before stated, the ring wheels 81 rest upon the frame 83, and the end of this frame rests in a notch in a standard 95, this standard being secured upon a pivoted plate 97. A lever 99 mounted upon a stud 101 has one arm operating under the plate 97, and the other arm projects downwardly into the path of the moving cash drawer. The cash drawer is provided with a plate 103 at the end of which is the swinging bracket 105, see Figs. 8, 9 and 10, said bracket being adapted to be swung into a position in line with the plate 103, so that when the drawer is closed the end of the bracket 105 strikes the downwardly projecting end of the lever 99, turning said lever upon its axis and raising the plate 97, and with it the standard 95 and one end of the frame 83, and thereby raising one side of all of the ring wheels 81 and causing them to be clear of the registering wheels 87. The lever 99 is held in this position until the drawer has passed substantially to its inner position, when the end of the lever will ride off from the end of the plate 103 and the lever will assume its normal position, the plate 97 will return to its original position, and the frame 83 and the wheels 81 will be lowered and brought into their lowest position. The swinging bracket 105, as the drawer approaches its inner position, will strike against the curved guide plate 107 and be turned around to the position shown in Fig. 9. When the drawer is open this bracket will engage the curved guide plate 111 and will be by it turned into line with the plate 103. The swinging bracket 105 is provided simply for the purpose of economizing space. The plate 103 could be extended so as to be as long as the plate and bracket together and which would then answer the same purpose, but provision would have to be made at the back of the casing to accommodate the plate when the drawer was closed. When the drawer is opened the wheels 81 are turned by the movement of the indicating wheels and their tubular shafts, and the registering wheels 87 are also turned to a sufficient extent to register the amount indicated by the indicating wheels at the last preceding operation.

As there is a series of the indicating wheels 87 each one of which is turned by an independent ring wheel, it is necessary to provide means when each wheel has made a complete revolution, for carrying the amount indicated by it to the next succeeding wheel. For this purpose we provide a series of levers 113 arranged beneath said wheels and each provided with a spur or projection 115 adapted to be engaged by a pin 117 on the wheel 87. A spring 119 is arranged to engage the end of the lever 113, and this spring will hold the lever either in its elevated or depressed position. Each of said levers is provided with a pawl 121 and spring 123, said pawl being arranged to engage the next succeeding registering wheel. Arranged beneath the lever 113 is the quadrant 125 provided with a series of shoulders 127 arranged in steps thereon. An arm 129 extends downwardly from this quadrant, the quadrant and arm being pivoted upon the stud 101. The arm 129 is arranged to project through the slot in the bottom of the cash drawer when the quadrant and arm are in their normal position. An inclined plate 131 is provided upon the end of the cash drawer for the purpose of engaging the arm 129. The operation of these parts is as follows: As the wheel 87 makes a complete revolution its pin 117 engages the projection 115 on the lever 113 and depresses said lever, thereby depressing the pawl 121 carried thereby and causing it to engage the next notch in the wheel. When the drawer is closed the inclined plate 131 engaging the arm 129 turns the quadrant 125, and the stops upon said quadrant successively engage the levers 113, or any of them that have been depressed, and raises them to their normal position, where they are held by the springs 119.

We also provide means for operating the printing device for the purpose of registering the amount of each transaction upon a suitable strip carried upon the rolls 91 upon the slide 93. As before stated, these rolls are arranged in the frame 89, and said frame carries the rolls 91 upon which the paper or recording strip is wound. This strip also passes over the roll 91', and this roll is arranged directly beneath the ring wheels 81 at the part at which they are provided with the series of type. A cross bar 133 is arranged above the wheels 81 directly over the roll 91', and this cross bar is carried upon the upper ends of standards 135. A standard 137 is arranged between the two parts of the frame 89, and said frame is provided with the cross bar 89' which extends above the top of the standard 137. A lever 139 is pivoted upon said standards and at its upper end it carries the bell crank lever 141 which is pivoted upon the end of the lever 139, and is provided with a spring 143 that is connected to the casing of the machine and to the other end of the lever 141. A stop 145 for the lever 139 is provided upon said standard 137. The long end of the lever 141 projects through the slot in the standard 137, and engages the lower end of the screw 147 on the cross bar 89'. This screw may be adjusted so as to regulate the movement of the frame 89. The lower end of the lever 139 engages a slot in the plate 147 arranged upon the cash drawer. A projection 149 is also arranged upon this plate so that when the lower end of the lever is in the plate 147, the end of the projection 149 will be in engagement with or close to the lever 139 at a point considerably above its lower end. By this means the parts being in the position shown in Fig. 11, when the cash drawer is closed, upon the opening of the cash drawer the lever 139 will be turned into the position shown in Fig. 11 by dotted lines A; and thereby the frame carrying the recording strip will be raised so as to press the strip against the type on the ring wheels 81. By this means the amount and character of the previous transaction will be recorded on said strip. When the cash drawer is closed the end of the lever will be brought over the slot in the plate 147 and the projection 149 will engage the lever, turning it upon its pivot and forcing its lower end into said slot, and bringing the upper end, together with the bell crank lever 141 carried by it, into the position shown by full lines in Fig. 11.

In some instances we prefer to provide means for raising the registering wheels 87 instead of raising the ring wheels 81, and we have shown a construction for this purpose in Figs. 14 and 15 of the drawings. As shown in this figure the arms 16 are connected to the ring wheels 81 by a rigid connection so that said wheels do not have any vertical movement but the registering wheels 87 are arranged upon the vertically movable frame 88, this frame being arranged to slide upon the standards 90. Pivoted upon the frame is the quadrant 92 carrying upon its lower end the roll 94. A plate 96 having the beveled ends 98 is arranged upon the cash drawer, and this plate is adapted to pass under the roll 94 as the cash drawer is opened or closed. When the drawer is opened the quadrant is turned toward the frame 88 and strikes against said frame which limits its further movement, and the roll 94 passing on to the highest part of the plate 86 causes the frame 88 and the registering wheels to be raised. When the drawer is closed the quadrant is turned in the opposite direction and its first movement carries the end of the quadrant under the stop 100, and any upward movement of the frame 88 is thereby prevented. The registering wheels 87 are thus held in their lowest position while the ring wheels 81 are moved in one direction, and they are raised so as to be under engagement with said ring wheels as said ring wheels are moved in the other direction.

In some instances, we prefer to so arrange the cash-drawer that it will remain open after the indicating, registering and recording devices have been operated. For this purpose we prefer to arrange this device as shown in Figs. 16, 17, and 18. In this construction, 71 represents the top plate of the casing above the cash-drawer, and the catch 73 is shown in dotted lines in Fig. 16. An independent cover or slide 151 is arranged over the cash-drawer 57, and both the cash drawer and the cover are arranged to move in ways independently of each other. The cover 151 is in this instance provided with the arm 75 that, when said cover is drawn out, is engaged by the catch 73. This cover is connected to the indicating mechanism and to the spring 59 in the same way that the cash drawer is connected in the construction already described, so that when the cover is drawn out it is caught by the catch 73 and at the same time the indicating wheels are set at zero. When a key of the last series is operated, the cover is released and drawn back by the spring, and the indicating wheels are set to indicate the desired amounts or characters. The cover 151 is provided with a lug 161 which is arranged to engage a lug 163 on the cash-drawer. By this means, whenever the cover is drawn out the cash-drawer moves with it. The cash drawer is provided with a notch 165, and the cover with a gravity pawl or dog 167 that engages said notch, and prevents the cash-drawer being drawn out without drawing out the cover. A stationary lug 169 on the casing locks the cover when closed until the drawer is closed, when it is raised and changes the lock from lid to cover. When the cover is drawn out to the extent of its movement the lug 171 on the casing engages the dog 167 and disconnects the cover from the cash-drawer, and when the cover is released and drawn back by the spring the cash-drawer remains open, and is closed by hand or by any suitable means. The cover may be provided with a slot or slots 173 that are over the coin receptacles in the cash-drawer when both cover and cash-drawer are open, and through these slots coins may be dropped into the coin receptacles before the cover is drawn back.

Having thus described our invention, we claim as new and desire to secure by Letters Patent—

1. In a cash-indicator, the combination, of a series of indicating wheels, with a series of independent key-levers, operating arms for said wheels, movable plates, each provided with a series of dogs arranged to be engaged by the key-levers when the indicating wheels are set at zero and to be put in position by said key-levers to engage said operating arms, substantially as described.

2. In a cash-indicator, the combination, with a series of indicating-wheels, each mounted upon a tubular shaft, of an operating arm connected with each of said shafts, a series of movable plates each provided with a series of dogs a series of key-levers, means for moving said plates into position for said dogs to be moved by said key-levers, and means for reversing the movements of said plates and thereby causing the dogs that have been moved by the key-levers to engage the operating arms of the indicating wheels, substantially as described and for the purpose set forth.

3. In a cash-indicator, the combination, with a series of indicating wheels provided with operating arms, of a series of independent key-levers disconnected from the mechanism of the machine, and mechanism for operating said indicating-wheels arranged to be brought into position to be set by said key-levers, and to be moved away from said key-levers after being set substantially as and for the purpose set forth.

4. In a cash-indicator, the combination, with a series of indicating wheels provided with operating arms, of a series of independent key-levers disconnected from the mechanism of the machine, movable plates each provided with a series of dogs, and arranged to be brought into position for said dogs to be moved by said key-levers whereby said dogs may be set so as to engage the operating arm of the indicating wheels, substantially as and for the purpose set forth.

5. The combination, in a cash-indicator, with the horizontal indicating - wheels mounted upon tubular shafts, of the operating arms connected to said shafts, the slotted guide-plates for said arms, the movable plates carrying the series of dogs, and the key-levers arranged to set said dogs when the indicating-wheels are at zero, substantially as and for the purpose set forth.

6. The combination, in a cash-indicator, with the indicating - wheels and their operating arms, of the independent key-levers and the movable plates 35 provided with the dogs 41 arranged to be set by said levers in position to engage said operating arms, and means for moving said plates substantially as and for the purpose specified.

7. In a cash-indicator, the combination, with the indicating-wheels provided with the operating arms 17, the slotted guide-plates 23 provided with the notches 25, the movable plates 35 provided with the recesses 37 and the dogs 41, means for holding said dogs in an elevated or depressed position, the series of key-levers 53 arranged to engage the dogs 41 and move them into an elevated position when the indicating-wheels are at zero and the operating arms 17 are in the notches 25, and means for moving said plates 35 substantially as and for the purpose set forth.

8. The combination, with the indicating wheels, and their operating arms 17, and with the independent and disconnected key-levers, of the guide-plate 23 provided with the notches 25, and having slots through which said operating arms project, the movable plates 35, provided with the dogs 41, means for holding said dogs in an elevated or depressed position, means for moving said plates to bring the dogs in position to be operated by said key-levers whereby any of said dogs may be elevated, means for reversing the movement of the plates 35 and thereby causing the elevated dogs to engage the operating arms 17, and means for depressing said dogs, substantially as and for the purpose specified.

9. The combination, with the indicating-wheels and their operating arms, of a series of independent key-levers, the movable plates provided with the series of dogs, said plates being arranged to move all of said indicating wheels to zero as the plates are moved in one direction and said dogs being arranged to be set by the key-levers so as to engage the operating arms of the indicating wheels as said plates are moved in the opposite direction, substantially as and for the purpose set forth.

10. The combination, with a series of horizontal indicating wheels, of vertical tubular shafts upon which said wheels are mounted, the horizontal operating arms pivotally supported upon said shafts, the slotted guide-plates into which said arms project, each provided with a notch 25, the horizontally swinging arms 31 carrying the curved plates 35, provided with the recesses 37 and with the dogs 41, and the independent key-levers adapted to move said dogs when the indicating wheels are set at zero, and means for moving said arms and plates, substantially as described and for the purpose set forth.

11. The combination, in a cash indicator, with the indicating wheels and their operating arms, of the independent key-levers and the movable plates 35 provided with the dogs 41 arranged to be set by said levers in position to engage said operating arms, and means connected with the cash-drawer for moving said plates 35, substantially as described.

12. The combination, in a cash indicator, with the indicating wheels and their operating arms, of the independent key-levers, the movable plates 35 provided with the dogs 41 arranged to be set by said levers in positions to engage said operating arms, the cash drawer, means connecting said cash-drawer with said plates 35, a spring for closing said cash drawer, a latch for holding said cash-drawer in its open position, and means arranged to be operated by one set of levers only for releasing said cash-drawer, substantially as and for the purpose set forth.

13. In a cash indicator, the combination, with an indicating device, of a series of movable dogs, means for setting any dog in said series, and automatic means for holding each dog in the position in which it is set, whereby, as the dogs are moved the one that is set governs the indicating device, substantially as described.

14. In a cash indicator, the combination, with indicating devices, of several series of movable dogs, means for setting any dog in each series, and automatic means for holding each dog in the position in which it is set, whereby, when the dogs are moved the ones that are set govern the indicating devices, substantially as described.

15. In a cash indicator, the combination with indicating devices, of movable dogs, keys for setting said dogs, and automatic means for holding each dog in the position in which it is set by its key, whereby, the dogs that are set by the keys determine the positions of the indicating devices, substantially as described.

16. In a cash indicator, the combination, with an indicating device, of a series of movable dogs, means for setting any dog in said series, an independent controlling device for holding any dog in the position it occupies before or after being set, and means for moving all of the dogs and causing those that are set to govern the indicating device, substantially as described.

17. The combination with the ring-wheels 81, of the cross-bar 133 supported upon standards 135, the frame 89 carrying the rolls and recording strip, the lever 139 having pivoted thereon the bell crank lever 141 connected to a spring 143, and a slotted plate 147 and projection 149 upon the cash-drawer engaging said lever 139.

18. In a cash indicator, the combination with indicating mechanism, of a movable cash-drawer, and an independent slide or cover, and means for releasing said cover and permitting it to be drawn back independently of the cash drawer at the completion of the operation of the indicating device, substantially as described.

19. In a cash indicator, the combination with the indicating device and the series of operating keys, of a cash-drawer, and an independent movable cover or slide, means connecting said cover or slide with the indicating mechanism whereby said mechanism is set at zero when the cover is drawn out, and means operated by one or more of the keys for releasing said cover, and a spring for returning said cover to its normal position and moving the indicating mechanism, substantially as described.

20. In a cash indicator, the combination with the indicating mechanism, of a movable cash-drawer, and a movable and independent slide or cover, means on said cover for engaging the cash-drawer when the cover is drawn out, and means for locking said cover and cash-drawer together until the cover is drawn out to the extent of its movement, substantially as described.

21. In a cash indicator, the combination with a movable cash-drawer, of an independent slide or cover, said cash-drawer and cover being arranged to move together when they are drawn out, and said cover being arranged to close independently of said cash-drawer.

In testimony whereof we have hereunto set our hands this 21st day of March, 1893.

PETER J. LANDIN.
FLETCHER L. WALKER.

In presence of—
A. C. PAUL,
FREDERICK S. LYON.